United States Patent [19]

Miyagi et al.

[11] 3,980,561
[45] Sept. 14, 1976

[54] DEVICE FOR PURIFYING SEWAGE

[75] Inventors: Toru Miyagi; Nobuyoshi Katakai; Masanori Narita; Tatsuya Uchida, all of Shimodate; Minondo Kimura, Inazawa, all of Japan

[73] Assignee: Hitachi Chemical Company, Ltd., Tokyo, Japan

[22] Filed: Mar. 11, 1975

[21] Appl. No.: 557,351

[30] Foreign Application Priority Data
Mar. 12, 1974    Japan.............................. 49-28410

[52] U.S. Cl................................ 210/151; 210/220; 210/274
[51] Int. Cl.² ........................................ C02C 1/04
[58] Field of Search.................... 210/151, 220, 274; 55/223, 234

[56] References Cited
UNITED STATES PATENTS

| | | |
|---|---|---|
| 630,988 | 8/1899 | Reisert............................ 210/274 X |
| 810,846 | 1/1906 | Cunningham....................... 210/274 |
| 1,727,601 | 9/1929 | Imhoff............................ 210/220 X |
| 2,008,507 | 7/1935 | Laughlin........................... 210/151 |
| 2,204,093 | 6/1940 | Mallory........................... 210/220 X |
| 2,340,842 | 2/1944 | Rerbold et al...................... 210/151 |
| 2,439,764 | 4/1948 | Walker........................... 210/151 X |
| 3,010,581 | 11/1961 | Knapp et al. ....................... 210/151 |
| 3,567,629 | 3/1971 | Arkas et al. ...................... 210/151 X |

Primary Examiner—John Adee
Attorney, Agent, or Firm—Stewart and Kolasch, Ltd.

[57]    ABSTRACT

A device for purifying sewage by employing a bed of aerobes or activated sludge characterized by the use of a movable air supply means which is moved across the bottom portion of the bed to apply a concentrated supply of air to a limited portion of the bed to effect air washing of the bed and also applies the air washing to the entire bed in a predetermined period of time.

10 Claims, 10 Drawing Figures

DEVICE FOR PURIFYING SEWAGE

BACKGROUND OF THE INVENTION

1. Field of the Invention

The present invention relates to a device for purifying sewage including organic material by employing aerobes and, more particularly, to an improvement of such a device for controlling the thickness of a bed of the aerobes or activated sludge so as to avoid plugging of the bed.

2. Description of the Prior Art

In the conventional sewage purifying devices of the aforementioned type, there has been a problem that the bed of aerobes or activated sludge which is adapted to be traversed by sewage dissolved with oxygen becomes plugged after a period of operation due to a substantial increase of aerobes which are usually carried by a perforated frame structure of the bed. If the plugging of the bed occurs, resistance to sewage flow increases, causing poor circulation of sewage in a vessel of the purifying device. Furthermore, if the layer of aerobes becomes thicker, bacteria in an internal portion become anaerobic and thus the purification efficiency lowers.

A conventional method to remove the plugging of the bed is to wash the bed by water by flowing the same in a reversed direction, generally vertically upwardly through the bed. However, this method is uneconomical since it requires purification of the water which is used for washing. An alternative approach to the problem of the plugging of the bed has been to blow air upwardly through the bed. In the conventional approach, however, an air injection means is fixedly arranged below the bed to cover the entire bottom area of the bed and is adapted to supply air simultaneously to the entire body of the bed, whereby it requires a blower of a relatively large capacity which is operated only a few minutes with a relatively long interval, thus with a very low rate of operation.

SUMMARY OF THE INVENTION

Therefore, it is the object of the present invention to solve the abovementioned problems with a device for purifying sewage by employing a bed of aerobes or activated sludge and by providing an improved device equipped with improved means to control the thickness of the layer of aerobes or activated sludge in the purifying bed.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished by a device for purifying sewage comprising a vessel having inlet and outlet ports and adapted to receive sewage and form a bath of the same, a micro-organism carrying bed structure provided in said vessel to occupy a part of the space in said vessel and leaving a free space which operates as a settling chamber, and air supply means which, in a first mode of operation, supplies air into said bath in a manner to dissolve oxygen in the sewage and generate a normal circulating flow of sewage which traverses said bed structure downwardly and, in a second mode of operation, supplies air particularly to said bed structure to generate an agitating reverse flow of a sewage-air mixture which traverses said bed structure in the upward direction. The air supply means includes a limited number of air nozzles which are moved across a bottom portion of said bed structure so as to supply air to a limited portion of said bed structure at an instant and supply air to the entire bed structure in a predetermined period of time.

According to a particular feature of the present invention, said bed structure may be an annular body having a substantially vertical axis and said air nozzles may be carried by horizontal tubes projecting radially from a central tube member which is rotatably mounted along said axis of said annular bed structure. In this case, said annular bed structure may preferably define an aeration chamber at its central portion, in which air is supplied from a part of said air supply means according to said first mode of operation. Said part of said air supply means may include a plurality of air nozzles of fixed type.

According to another particular feature of the present invention, said central tube member carrying said horizontal tubes may be driven by a motor to rotate around its central axis.

Alternatively, an assembly of said central tube member and said horizontal tubes may be driven by reaction force of air jets which are ejected from said nozzles to rotate around the central axis of said central tube member.

According to still another feature of the present invention, a lower end of said central tube member may preferably be positioned below said nozzles by a vertical distance which provides a pressure head large enough to urge air in the tubes from said nozzles.

Said air nozzles may be adapted to be operated intermittently for a predetermined period to move across the bottom portion of said bed structure. Alternatively, said air nozzles may be adapted to be operated continuously to move across the bottom portion of said bed structure.

According to a further feature of the present invention, said settling chamber may preferably be defined to have a funnel-like bottom wall which inclines toward a central exhaust port and a scraping means which moves across said bottom wall may be provided. Said scraping means may be driven together with said air nozzles.

As an alternative structure, said bed structure may be a linear body and said air nozzles may be reciprocated to across the bottom portion of said bed structure. In this case, said nozzles may also be driven by an external linear drive means which is alternately operated in opposite directions. Alternatively, said nozzles may be separated into two groups which are carried by at least two parallel pipes, respectively, to open in opposite directions which generate opposite horizontal thrusts due to air jets ejected from the air nozzles, each of said two groups of air nozzles being alternately supplied with compressed air so as to cause reciprocating movement of the air nozzles.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

The present invention will now be described in more detail with respect to some preferred embodiments and with particular reference to the accompanying drawings.

Figure 1:
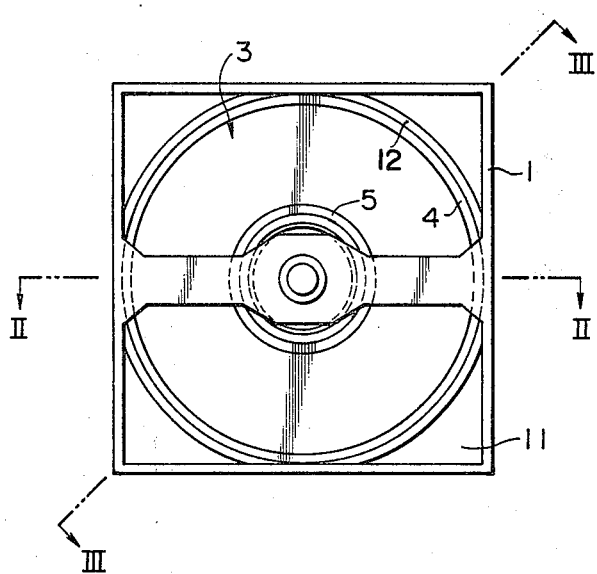
FIG. 1 is a plan view of an embodiment of a device for purifying sewage according to the present invention.
Figure 2:
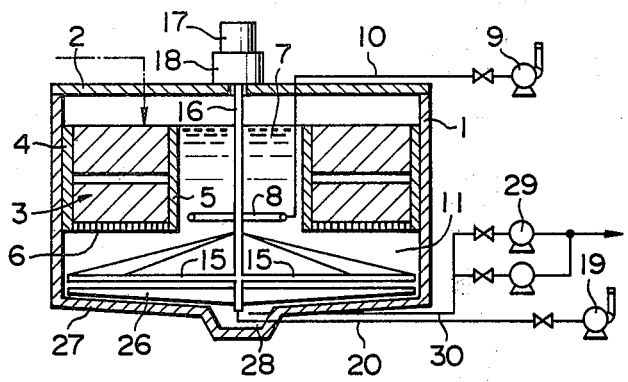
FIG. 2 is a sectional view along line II—II in FIG. 1.
Figure 3:
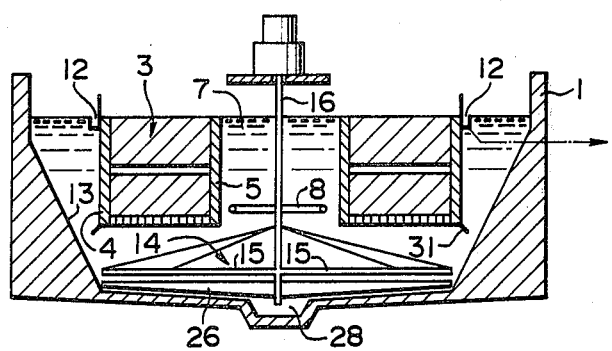
FIG. 3 is a sectional view along line III—III in FIG. 1.

FIGS. 1–3 show a first embodiment of the present invention comprising a body or vessel 1 of substantially square, horizontal section, the upper open end thereof being traversed by a bridge member 2. The vessel is adapted to receive sewage to be purified through an inlet port (not shown) which opens at an upper portion thereof. The sewage forms a bath within the vessel. Within the vessel there is provided a micro-organism carrying bed structure generally designated by 3, which has an annular body defined by an annular outer wall 4, an annular inner wall 5 and an annular bottom wall 6. The bottom wall 6 is a perforated structure and the space confined by the wall members 4, 5 and 6 is filled with perforated structure-forming elements such as plastic pellets, plastic tetraport porcelain rings, short cut pipe pieces, honeycomb elements, coal pieces and other filling elements so as to form a perforated structure which has a proper space ratio and allows for the living of micro-organisms and the traversing by sewage therethrough. The perforated bed structure 3 provides a bed for breeding micro-organisms such as aerobes which perform aerobic reaction by being supplied with sewage mixed with oxygen. As particularly shown in FIG. 2, to avoid pluggig the bed, to construct the bed it is desirable in two or more stages and provides a relieving space therebetween.

A central space defined by the inner annular wall 5 of the bed structure forms an aeration chamber 7. In the aeration chamber, an annular tube 8 formed with a plurality of air nozzles is provided and supplied with air from a compressed air source (blower) 9 through a pipe line 10. Air is ejected from the nozzles into the sewage which fills the aeration chamber and the oxygen of the air is dissolved in the sewage. The sewage supplied with oxygen flows into the bed structure 3 from its upper end and traverses the bed structure in the downward direction and, during the traversing operation, the sewage is fed to the micro-organisms or aerobes living and breeding in the bed structure and is thus purified.

The purified sewage goes through a settling process in a settling chamber 11 provided below the bed structure 3 and clean liquid overflows into a groove 12 formed along the outside surface of the annular wall 4. When the vessel 1 has a substantially square horizontal section and the bed structure 3 is formed as a circular annular body, the spaces remaining at the four corners can be effectively used as settling chambers. In the shown embodiment, the corner spaces are formed to have inclined walls 13 to facilitate the precipitation of solid materials included in the sewage.

In the settling chamber 11 and below the bed structure 3, there is provided an air supply means generally designated by 14, which forms an important feature of the present invention. The air supply means 14 includes several horizontally arranged tubes 15 which are carried by a central tube member 16 and project radially from the central tube member. The central tube member 16 is rotatably mounted along a central axis of the annular bed structure 3 and is adapted to be driven by a motor 17 by way of a reduction means 18. The horizontal tubes 15 are provided with a plurality of air nozzles and are supplied with air through the central tube member 16, which in turn is supplied with air from a compressed air source (blower) 19 through a pipe line 20. In operation of the air supply means 14, as described in detail hereinunder, the horizontal tubes 15 are rotated around the central axis of the annular bed structure 3 by the motor 17 by way of the reduction means 18 and the central tube member 16 while air is supplied from the source 19 so that the air is ejected from the nozzles provided in the horizontal tubes 15.

Figure 4:
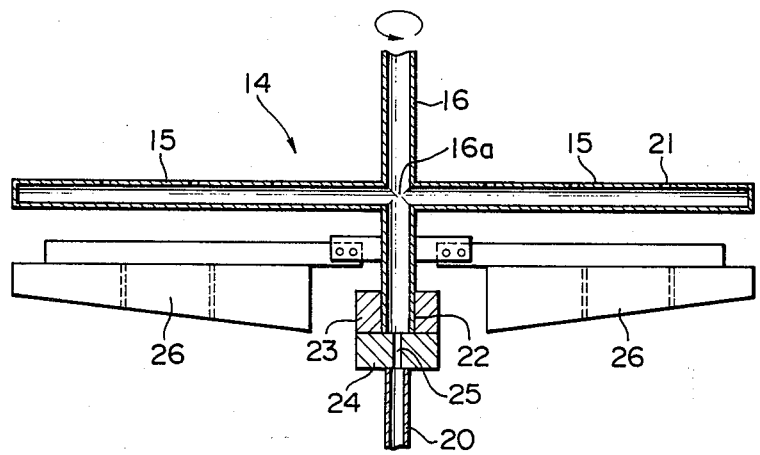
FIG. 4 shows an air supply means included in the device shown in FIGS. 1–3 in more detail on an enlarged scale.

FIG. 4 shows the air supply means 14 in more detail. As seen in the figure, this tubes 15 are provided with a plurality of air nozzles 21 arranged along the length of the tubes. A lower end portion 22 of the central tube member 16 is rotatably received by a bearing block 23 and is opposed with a connection block 24 provided with a passage 25 which is in communication with the air supply pipe line 20. In this structure, the length of a portion of the central tube member 16 extending from a connecting portion 16a with the horizontal tubes 15 to the lower end 22 is designed to provide a pressure head which is large enough to urge air into the tubes 15 and 16 and through the nozzles 21 so that the air which has once been supplied into the central tube member 16 is automatically ejected from the air nozzles 21 into the bath of sewage. As shown in FIG. 4, the central tube member 16 further carries a plurality of scrapers 26 projecting radially therefrom. These scrapers are rotated together with the central tube member 16 and the horizontal tubes 15 and give a scraping action to materials deposited on a bottom wall 27 of the vessel so as to move the materials toward an exhaust groove 28 formed at a central portion of the bottom wall. The materials which include solid materials and activated sludge are removed from the bed structure when the amount of the activated sludge becomes so great as to cause plugging of the bed structure, and are pumped out by sludge pumps 29 through a pipe line 30.

As the sewage supplied with oxygen in the aeration chamber 7 is continuously fed into the bed structure 3, the aerobes or activated sludge gradually breed, increasing the thickness of the layer thereof attached to the supporting perforated structure of the bed and finally the amount of the activated sludge becomes so high that it plugs the perforated structure of the bed. If the plugging of the bed structure occurs, the sewage flow through the bed is obstructed and the internal portion of the micro-organism is changed to be anaerobic, resulting in a poor purification efficiency of the device. Therefore, the superfluous amount of activated sludge must be removed before the abovementioned plugging occurs. This is accomplished by the air supply means 14 provided according to the present invention. When the purifying operation has been initiated for a predetermined period of time and where it would be expected that the activated sludge has increased in quantity beyond a desirable amount, air is supplied to the air supply means 14 or the tubes 15 and the motor 17 is energized to drive the horizontal tubes 15 around the central axis of the annular bed structure 3. The air ejected from the air nozzles 21 is almost directly supplied to the bed structure 3 through the bottom portion thereof. Such an air injection generates a highly agitating flow of a sewage-air mixture which traverses the bed structure upwardly in a reverse direction to the normal flow of sewage in a normal purifying operation of the device, said agitating flow scaling off a part of the layer of activated sludge from the body portion thereof. Activated sludge removed from the bed structure 3 falls through the aeration chamber 7 and deposits on the bottom wall 27 of the vessel. The deposited sludge is moved toward the central exhaust groove 28 by the action of the scrapers 26 and is pumped out by the sludge pump 29. Since the air injection nozzles 21 carried by the horizontal tubes 15 supply air to a limited portion of the bed structure at the instant it is desired, the compressed air source 19 of a relatively small capacity can effect strong agitation of the bed structure and effectively accomplish the peeling off of the superfluous amount of activated sludge from the particularly limited portion of the bed structure. However, since the horizontal tubes 15 are rotated around the central axis of the annular bed structure, the strong agitating action by the air injection is applied to the entire bed structure in a predetermined period in which the horizontal tubes 15 are rotated for a predetermined period of rotation.

In order to increase the effectiveness of air supply to the bed structure from the air injection nozzles 21, an inclined annular baffle 31 may be provided around the annular wall 4.

Figure 5:
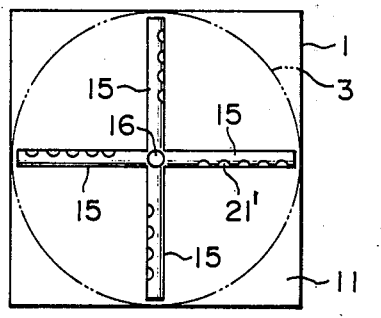
FIG. 5 is a schemmatical plan view of another embodiment of the air supply means.
Figure 6:
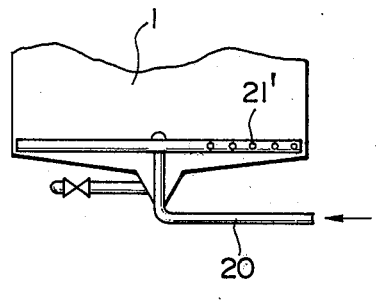
FIG. 6 is a side view of the air supply means shown in FIG. 5.
Figure 7:
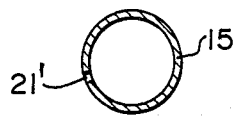
FIG. 7 shows a cross section of a pipe forming the air supply means shown in FIGS. 5 and 6.

FIGS. 5, 6 and 7 show a modification of the air supply means 14. In this modification, the air nozzles 21$^1$ are formed to open substantially in the horizontal direction in a manner to generate a common thrust force which drives the horizontal tubes 15 around the central axis of the vertical tube member 16. In this modification, therefore, the central tube member 16 need not be driven by an external power source such as the motor 17 and the reduction gear 18.

Figure 8:
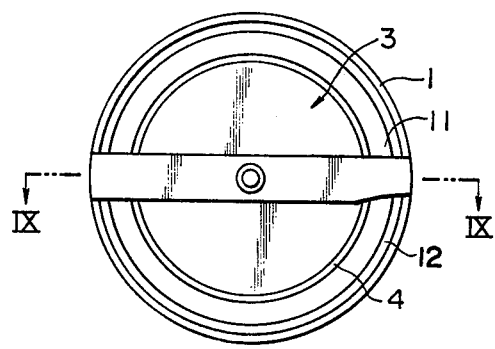
FIG. 8 is a plan view of a second embodiment of the device for purifying sewage according to this invention.
Figure 9:
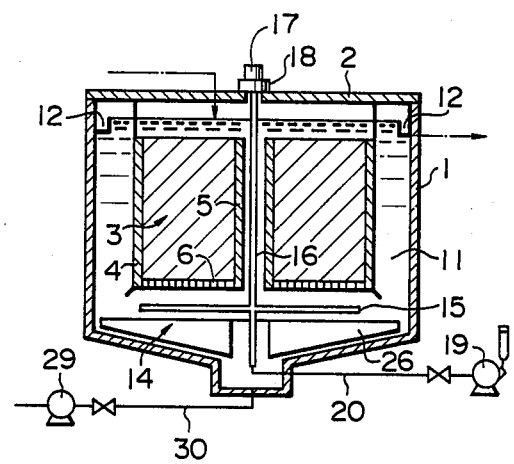
FIG. 9 is a sectional view along line IX—IX in FIG. 8.
Figure 10:
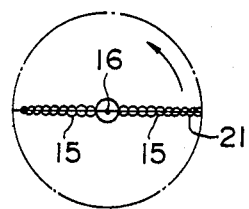
FIG. 10 is a schemmatical plan view of an air supply means incorporated in the device shown in FIGS. 8 and 9.

FIGS. 8 and 9 show another embodiment of the device for purifying sewage according to the present invention. In this embodiment, the air supply tube 8 for dissolving oxygen in sewage in the aeration chamber 7 in the first embodiment is omitted and the oxygen dissolving operation is simultaneously performed by the air supply means 14 which, in the second embodiment, is constituted in substantially the same structure as in the first embodiment, and, therefore, the corresponding portions in the second embodiment are designated by the same reference numerals. By contrast to the air supply means 14 in the first embodiment in which the air supply means is operated intermittently after a predetermined period of purifying operation has been continued, the air supply means 14 in the second embodiment is continuously operated so that the horizontal tubes 15 are continuously rotated around the central axis of the annular bed structure 3 while ejecting air from the air nozzles 21 carried by the horizontal tubes. In this manner of operation, a particular portion of the annular bed structure which is confronted with one of the horizontal tubes 15 or a group of the air nozzles 21 is applied with a strong agitating flow of sewage-air mixture which traverses upwardly through the particular portion of the annular bed structure, while the other portions of the annular bed structure are relieved from the aforementioned agitating flow of the sewage-air mixture but is applied with moderate supply of air or oxygen which is dissolved in the sewage in these portions in a manner similar as that which occurs in the aeration chamber 7 in the first embodiment. Strongly upwardly pumping action applied to the particular portions confronted by the horizontal tubes 15 causes, in turn, the downward flow of sewage through the other portions of the annular bed structure while being treated with the purifying action by the micro-organism or activated sludge breeding in the bed structure. The superfluous amount of activated sludge which has been scaled off from the bed structure falls down through the central space, in which the central tube member 16 is arranged, toward a settling chamber 11 and deposits on the bottom wall 27. The deposited sludge is gathered to the central exhaust groove 28 in a manner similar to that in the first embodiment and is pumped out by the sludge pump 29.

Thus, in the device for purifying sewage according to the present invention equipped with the rotatable air supply means, superfluous activated sludge which will plug the bed structure and deteriorate the purifying performance of the device is periodically or continuously removed from the bed structure and the device is always maintained in good condition to perform the purification of the sewage at a designed high efficiency.

The following is the data collected of an example of the operation of the device constructed according to the present invention:

TABLE I

| OUTLINE OF THE DEVICE | |
| --- | --- |
| Rate of aeration | 100l/min |
| Scraper | 12 rotations/Hr |
| Rate of washing air supply | 90l/min (supply tube being rotated together with scraper) |
| Vessel: | |
| Volume | 2.8m³ |
| Surface area | 1.69m² |
| Bed: | |
| Volume | 2.0m³ |
| Surface area | 1.4m² |
| Settling chamber: | |
| Surface area | 0.3m² |
| Surface loading | 1.6m³/m²Hr |
| Depth of bath: | 1.8m |
| Bed filler | Vinylchloride honeycomb core |
| Rate of processing | 0.5m³/Hr |

By employing the device of the above example, exhaust from a sewage purifying device employing activated sludge in a community plant is further treated for high purification. After 30 days of operation, the following performance was obtained in normal operation;

TABLE 2

| RESULTS IN NORMAL OPERATION | | | |
|---|---|---|---|
| | BOD | SS | $NH_3-N$ |
| Input water | 25 ppm | 27 ppm | 14 ppm |
| Processed water | 4 | 3 | 3 |
| Rate of purification | 84% | 88% | 78.6% |
| | (mean values) | | |

In the operation, the residence time was 4 hours, and the BOD loading ratio was $0.15 Kg/m^3.d$. Plugging of the bed structure began after about 5–6 days of operation. Then, washing was performed by the cycle of once per 4 days, each washing having a 10 minute duration. Activated sludge scaled off by the air washing was gathered in the settling chamber and sufficiently settled because the surface loading ratio of the settling chamber was $1.6 m^3/m^2.Hr$ which is large enough for the density of the activated sludge. During the air washing, the content of impurities become 1.5 times that shown in Table 2. However, the absolute value of the impurities was still in an acceptable range. After 8 days of operation, when the plugging of the bed structure occurred;, the quality of water was as shown in the following table, which apparently shows that washing of the bed structure is necessary.

TABLE 3

| | WATER IN PLUGGED CONDITION | | |
|---|---|---|---|
| Items | BOD | SS | $NH_3-N$ |
| Processed water | 13 ppm | 4 ppm | 12 ppm |

The following table shows the data of a second example of the device according to the present invention.

TABLE 4

| OUTLINE OF DEVICE (Second embodiment) | |
|---|---|
| Rate of aeration | 90 l/min |
| Scraper and air supply tube | 10 rotations/Hr |
| Bed: | |
| Volume | $0.7 m^3$ |
| Surface area | $0.78 m^2$ |
| Height | 0.8m |
| Settling chamber surface area | $0.35 m^2$ |
| Depth of bath | 1.3m |
| Bed filler | Vinylchloride honeycomb core |

By employing the above device, exhaust from a paper making plant was treated utilizing a treating rate of $0.35 m^3/Hr$, a residing time of 2 Hr, and a BOD loading ratio of $0.72 Kg/m^3.d$. After 30 days of operation, the following quality was obtained;

TABLE 5

| RESULTS OF OPERATION | | | |
|---|---|---|---|
| | BOD | COD | SS |
| Input Water | 60 ppm | 40 ppm | 60 ppm |
| Processed Water | 15 | 10 | 19 |
| Rate of Purification | 75% | 75% | 81% |

The exhaust supply to the device was added with 5 part of N source and one part of P source per 100 of BOD to control the PH value close to 7. The purifying rate was 75% and a stable operation was obtained. Activated sludge and SS was periodically removed from the bed structure and no serious plugging has occurred. The removed sludge settled sufficiently in the settling chamber under a surface loading ratio of $1.0 m^3/m^2.Hr$. Removal of the settled sludge was performed continuously or intermittently, but since the amount of sludge was relatively small, intermittent pumping seemed to be advantageous.

From the foregoing, it will be appreciated that the device according to the present invention can be operated economically by employing a compressed air source of a relatively small capacity without causing problems of plugging of the bed structure in the aerobic purification of sewage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A device for purifying sewage comprising a vessel having inlet and outlet ports and adapted to receive sewage and form a sewage bath therein, an annular microorganism-carrying bed structure disposed in said vessel, said annular bed structure defining a first space located at the center thereof and a second space located below said bed structure, said first and second spaces operating as an aeration chamber and a settling chamber, respectively, a first air supply means disposed in said aeration chamber for supplying air thereto in a manner to dissolve oxygen in the sewage contained in said aeration chamber and to cause a circulation of sewage flow in the upward direction through said aeration chamber and downward through said annular bed structure, and a second air supply means including at least one radial pipe rotatably disposed around the central axis of said annular bed structure within said settling chamber, said pipe having a plurality of air injection nozzles adapted to supply a mass of air bubbles which rise toward and through said annular bed structure thereby causing an agitating flow which traverses said bed structure in the upward direction and scales off a portion of the microorganisms from said bed.

2. The device according to claim 1, wherein means are provided for operating said air nozzles intermittently for a predetermined period across the bottom portion of said bed structure.

3. The device according to claim 1, wherein means are provided for operating said air nozzles continuously across the bottom portion of said bed structure.

4. The device according to claim 1, wherein said settling chamber is defined by a funnel-like bottom wall which is inclined towards an exhaust port and a scraping means is disposed in said settling chamber for movement across said bottom wall.

5. The device according to claim 1, wherein a scraping means is disposed in said settling chamber and attached to said central tube member for movement across said bottom wall and means are provided for driving said scraping means together with said air nozzles.

6. The device according to claim 1, wherein said radial pipe is supported by a central tube member which is rotatably mounted along the central axis of said annular bed structure.

7. The device according to claim 6, wherein the lower end of said central tube member extends below said nozzles by a vertical distance which provides a pressure head large enough to urge air in the tubes from said nozzles.

8. The device according to claim 6, wherein motor means are provided for driving said central tube member carrying said radial pipe, thereby causing said radial pipe to rotate around its central axis.

9. The device according to claim 6, wherein a plurality of radial pipes are rotatably disposed around the central axis of said annular bed structure, each of said radial pipes containing a plurality of air injection nozzles which face an adjacent radial pipe, said radial pipes being driven by the reaction force of air jets which are ejected from said air injection nozzles against the adjacent radial pipe to rotate said radial pipes and said central tube around said central axis.

10. The device according to claim 1, wherein said annular bed structure is provided with a perforated bottom wall.

* * * * *